Figure 1:
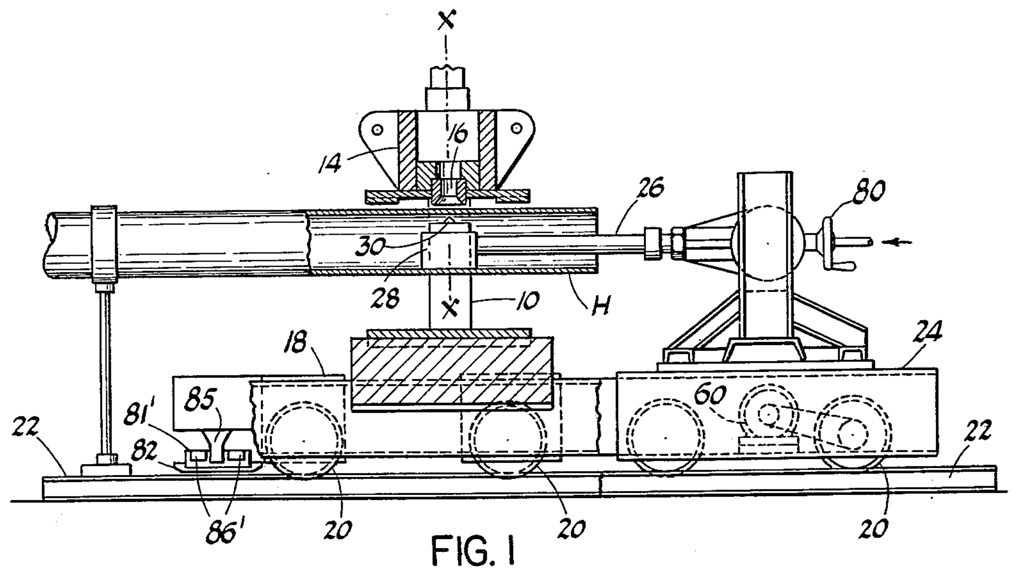

Jan. 22, 1963 A. HUET 3,074,460

CONTROL FOR NECK FORMING MACHINE

Filed Oct. 20, 1959 2 Sheets-Sheet 1

INVENTOR:
ANDRE HUET

BY James J. Whalen
ATTORNEY

CONTROL FOR NECK FORMING MACHINE

Filed Oct. 20, 1959 2 Sheets-Sheet 2

INVENTOR:
ANDRE HUET
BY James J. Whalen
ATTORNEY

United States Patent Office 3,074,460

Patented Jan. 22, 1963

3,074,460

CONTROL FOR NECK FORMING MACHINE

Andre Huet, Paris, France, assignor to Combustion Engineering, Inc., New York, N.Y., a corporation of Delaware Filed Oct. 20, 1959, Ser. No. 847,586
Claims priority, application France Oct. 21, 1958
3 Claims. (Cl. 153—21)

The present invention relates to apparatus for forming tubular nipples or necks on a tubular fluid distributing header or the like and particulrly to improved means for accurately indexing or registering the working elements of such a machine with the work area on the tubular work piece.

Applicant has disclosed in his previous application Serial No. 482,635, filed January 18, 1955, now Patent 2,911,029, issued November 3, 1959, a machine for fabricating nipples or necks on headers which machine consists essentially of a gantry carrying a lifting jack that bears a punch for penetrating a header in conjunction with a die associated with devices which apply it exteriorly to the header. The gantry bearing these parts is movable relatively to and along the header to fabricate necks through the action of the punch penetrating the wall of the header so that the metal is pushed into the die. When the header is stationary and the gantry mobile, the latter moves with a carriage on rails and is activated by an electric motor. It is, of course, indispensable that the gantry and the parts it bears should be stopped at the exact spot where the neck is to be made. Further, it is important that this operation of placing the gantry at the desired location should be done rapidly, because the area of the header where the neck is to be made is preheated to a pre-determined temperature for the piercing operation at a time when the gantry has not yet reached the location so that the gantry must be directed to the proper spot within a limited time, in order that the temperature of the heated area may not have time to drop below the working temperature.

The present invention contemplates a device to automatically stop the electric motor that drives the gantry, at the precise location where the gantry is in position to ensure the formation of the neck, that is, the spot where the axis of the punch and die coincides with a marker determining the location where the neck is to be effected.

According to the present invention, the indexing device consists essentially of two rods, one of which is placed on the header at the location where the neck is to be fabricated while the other rod is joined to the mobile gantry and is situated in the transverse plane perpendicular to the longitudinal axis of the header, which transverse plane passes through the axis of the punch and die. When the rods are brought into contact and, the gantry is therefore at the proper location, an electric current is caused to traverse a relay and the latter acts to stop power to the electric motor. Immobilization of the gantry is immediate, because of its weight on the rather light rail supporting it and since the moving of the gantry is effected at a relatively slow speed.

The following description when read in conjunction with the enclosed drawings as examples, will give an understanding of the manner in which the invention can be carried out.

Figure 2:
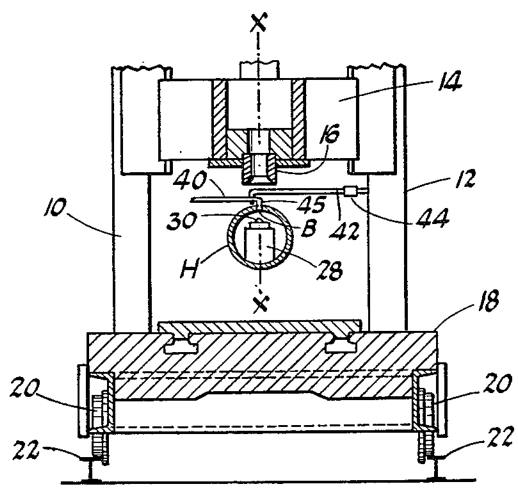

FIGURES 1 and 2 diagrammatically represent in longitudinal and transverse section the gantry of the neck fabricating machine in which the invention is embodied.

Figure 3:
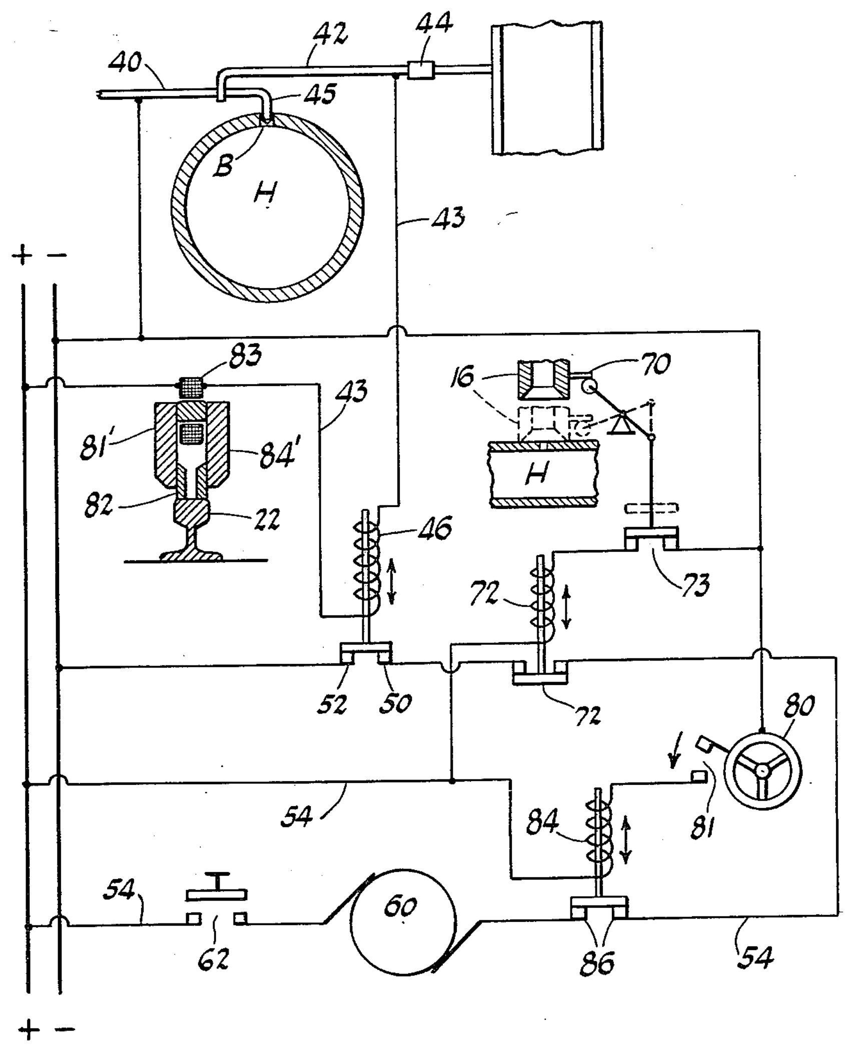

FIGURE 3 is a diagram showing the electrical circuit of an electrical relay controlled by the indexing rods of the machine embodying the invention.

The neck fabricating machine is constituted essentially by a gantry, comprising two columnar upright posts 10, 12, on which a cross-head 14, bearing a die 16, can slide. This gantry is supported by a carriage 18, the wheels 20 of which roll on rails 22. Joined to the gantry is a second carriage 24 which carries, a bar 26 extending into the header H on which necks are to be formed. At the extremity of bar 26 is located a lifting jack 28, activating a punch 30. The group 18, 24 can move on the rails 22 being driven by a motor 32. In construction the axis X—X of the gantry (FIGURES 1 and 2) coincides with the vertical axis of the die 16 and the vertical axis of the punch 30.

The header H on which the necks are to be made, is stationary and supported as at its extremities by means not shown. As may be seen in FIGURES 1 and 2, the whole set-up of the gantry and the carriage 24, carrying the jack 28, is arranged in such a manner that the jack 28 is set within the header and can slide together with the gantry along the header H by rolling on the rails 22, so as to permit effecting the successive necks.

The control device of the invention, consists essentially of two rods 40, 42. Rod 40 is manually located in its desired position along the header H and terminates at one end thereof in a hook portion 45 which enters an index orifice B drilled in advance in the wall of the header H, at the spot where a neck is to be effected. The other rod 42 is joined for instance, to the column 12 of the gantry and arranged so that it lies in the vertical plane, perpendicular to the longitudinal axis of the header, which plane includes the vertical axis X—X which passes through the axis of the die 16 and the vertical axis of the punch 30. Said rod 42 can be pivoted at 44, so as to be swung down out of the way during the period, when the indexing device is not in use.

The rods 40 and 42 are at least partly metallic so as to form part of an electrical circuit, FIGURE 3. Upon engagement of the rods 40 and 42 energization is effected of relay 46 having contacts 50, 52 located in the circuit 54 feeding the motor 60, which moves the gantry 18, 24 on the rails 22. The relay contacts 50, 52 normally are closed so that when contact is established between the rods 40 and 42, the relay 46 acts to open the electrical circuit feeding the motor 60. Power feed to set motor 60 in operation is effected through switch 62.

In accordance with the present invention, an extra safety device is provided for, so that motor 60 cannot run unless the die 16 be raised and the punch 28 lowered, thus avoiding a wrong maneuver. To this effect, the die 16 carries a contact member 70 which, when the die is in a raised position, closes the circuit of a relay 73 having closed contacts 72 in the feed circuit 54 of the motor 60. Likewise, a flywheel 80, whose rotation governs the arrival of the fluid under pressure in the jack 28 to ensure raising the punch 30, operates a switch 81 that closes the circuit of a relay 84 having normally closed contacts 86 in the feed circuit 54 of the motor 60 when said flywheel is in non-operating position, corresponding to the inoperative position of the punch 30. When the die 16 is raised and the flywheel 80 is not in operation, the relay contacts 73 and 86 are closed and the current in circuit 54 can pass to the motor 60 on closing the switch 62. When the preceding conditions are not fulfilled, that is, if the die 16 is lowered or the punch 30 raised, no current will be established because contacts 72 and 86 will be open.

If the conditions are fulfilled, the gantry 18, 24 moves as soon as one activates the switch 62 and continues until the moment when the rod 42 meets the rod 40 placed in the orifice B provided for at the location of the neck to be effected. The contact of the rods 40, 42 has the effect through relay 46, of cutting the circuit 54 of the motor 60 and, considering the inertia of the gantry and the relative slowness of its movement, the stop is immediate at this position where the plane X—X passes via the hole B at the location for the neck.

During the movements of the carriage which do not necessitate a precise stop, the rods and, particularly, rod 42 can be lowered laterally by means of the articulation 44.

To assure that the stopping of the electric motor 60 brings about an immediate stopping of the gantry, applicant also provides for operation of an electromagnetic brake of a known type at the same time as the motor is de-energized. In accordance with this there is provided under the carriage 18, bearing the gantry with die 16 and punch 36 an electro-magnetic brake 81′ the shoe 82 of which moves near the rail 22, on which the carriage rolls; shoe 82 may even travel near a parallel rail. The action of the electro-magnetic brake is produced by the contact of the two rods 40, 42. This contact closes the circuit 43 which, apart from controlling, the stopping of the electric motor, operates the electromagnetic brake 81′ of a known type. This brake is constituted by a coil 83 surrounding a magnetic core 84′, whose sliding lower part is the shoe 82 moving in the vicinity of the rail 22. When the coil 83 is energized, the magnetic circuit 82, 84′ is closed by the rail 22 immobilizing the shoe 82, which in its turn immobilizes tthe carriage 18, for instance by means of the stop 85, attached to the carriage and passing between two stops 86′ of the shoe 82.

What I claim is:

1. In a machine fabricating necks on a header and having a motor driven gantry bearing a jack operated punch disposable within the header and cooperating with a die supported outside the header in alinement with said jack; an electrical motor to move the gantry along said header on which necks are to be made; an electrical control device enabling the gantry to be stopped automatically at the proper position to effect a neck, said control device comprising two metallic rods, one of which rods is manually placed on the header at the location of the neck to be formed, this one rod being received in a suitable recess extending laterally inward of the header wall, the other rod being borne by the gantry and located in the vertical plane perpendicular to the longitudinal axis of the header, which plane passes through the axis of the punch-die ensemble; means connecting said two rods in an electrical circuit; a relay in said circuit arranged to be energized upon contacting engagement of said metallic rods; a second electrical circuit for energizing said motor; normally engaged contacts in said circuit adapted to be separated by said relay when energized upon movement of the gantry so that contact is made between the rods to thereby bring about the shutting off of the electrical current in the motor and the stopping of the gantry.

2. A supplementary safety device for the electrical control arrangement recited in claim 1 wherein the die and the jack are associated with switches which are operative so as to open to shut off the electric current feeding the motor so that said second circuit can be established only if the two elements, die and punch, are in a non-operative position with respect to the header.

3. A control device as recited in claim 1 wherein the gantry is movable along rails by said motor and an electro-magnetic brake mounted on the gantry acts, when energized, upon said rails to immobilize the gantry; and means in said first electric circuit controlled by contact of said rods for energizing said brake.

References Cited in the file of this patent

UNITED STATES PATENTS

| | | |
|---|---|---|
| 1,234,295 | Curry | July 24, 1917 |
| 1,460,569 | Brodesser | July 3, 1923 |
| 1,574,900 | Kellogg | Mar. 2, 1926 |
| 1,702,475 | Jahnig | Feb. 19, 1929 |
| 1,760,600 | Lockett | May 27, 1930 |
| 2,280,255 | Parker et al. | Apr. 21, 1942 |
| 2,711,674 | Abbott | June 28, 1955 |

FOREIGN PATENTS

| | | |
|---|---|---|
| 508,747 | Belgium | Feb. 15, 1952 |